(12) United States Patent
Matsuura et al.

(10) Patent No.: US 8,390,697 B2
(45) Date of Patent: Mar. 5, 2013

(54) IMAGE PROCESSING APPARATUS, IMAGE PROCESSING METHOD, IMAGING APPARATUS, AND PROGRAM

(75) Inventors: Masaru Matsuura, Kanagawa (JP); Naoki Kuzuya, Tokyo (JP)

(73) Assignee: Sony Corporation, Tokyo (JP)

( * ) Notice: Subject to any disclaimer, the term of this patent is extended or adjusted under 35 U.S.C. 154(b) by 188 days.

(21) Appl. No.: 13/064,216

(22) Filed: Mar. 11, 2011

(65) Prior Publication Data
US 2011/0267488 A1    Nov. 3, 2011

(30) Foreign Application Priority Data

Apr. 28, 2010    (JP) ................................ 2010-104353

(51) Int. Cl.
*H04N 5/228* (2006.01)
*H04N 7/18* (2006.01)
(52) U.S. Cl. ................... 348/222.1; 348/208.1; 348/154; 382/107
(58) Field of Classification Search .................. 348/154, 348/208.1, 208.4, 208.14, 208.16, 222.1
See application file for complete search history.

(56) References Cited

U.S. PATENT DOCUMENTS

| 2008/0199050 | A1* | 8/2008 | Koitabashi ..................... 382/107 |
| 2009/0079876 | A1* | 3/2009 | Takeshima et al. ............ 348/699 |
| 2009/0169059 | A1* | 7/2009 | Kleinjohann et al. ......... 382/107 |
| 2010/0302347 | A1* | 12/2010 | Shikata ........................... 348/36 |
| 2011/0243381 | A1* | 10/2011 | Tsagkatakis et al. .......... 382/103 |
| 2012/0013713 | A1* | 1/2012 | Sumitomo ....................... 348/46 |

FOREIGN PATENT DOCUMENTS

| JP | 05-289159 | 11/1993 |
| JP | 2006-222933 | 8/2006 |

OTHER PUBLICATIONS

B. D. Lucas, et al., "An Iterative Image Registration Technique with an Application to Stereo Vision," Intl. Joint Conf. on AI pp. 674-679, 1981.

* cited by examiner

*Primary Examiner* — Hung Lam
(74) *Attorney, Agent, or Firm* — Rader, Fishman & Grauer PLLC

(57) ABSTRACT

An image processing apparatus includes: a global motion estimation apparatus that performs global Motion Estimation on current and reference images and then outputs a Motion Vector, wherein the global motion estimation apparatus includes a motion estimation processing unit that has a function of executing an LK method two or more times across a whole screen to perform the global motion estimation between the current and reference images; and the motion estimation processing unit obtains a set of motion vectors based on at least information about pixel value variations and information in which a calculation result of an arbitrary calculation expression is added across a whole screen in first motion estimation, and determines whether to perform addition on each pixel according to a set condition when obtaining the at least information, and obtains and outputs a new set of motion vectors as a result of a second LK method when the condition is satisfied in second motion estimation.

20 Claims, 8 Drawing Sheets

IMAGE PROCESSING APPARATUS, IMAGE PROCESSING METHOD, IMAGING APPARATUS, AND PROGRAM

BACKGROUND OF THE INVENTION

1. Field of the Invention

The present invention relates to an image processing apparatus, an image processing method, an imaging apparatus, and a program that perform motion vector estimation (Motion Estimation (ME)) for estimating a global motion amount between two images of an image sequence.

2. Description of the Related Art

As a method which has been most frequently used to perform motion estimation, there is a block matching method.

In order to estimate global motion between images using a block matching method, the weighted average of Motion Vectors (MVs: local MVs) generated for each divided block is basically obtained across the whole screen.

Here, robustness can be improved by reducing the weight of a block of the local MV of which is not reliable (for example, refer to JP-A-5-289159 and JP-A-2006-222933).

As another motion estimation method, Lucas-Kanade method (LK method) is known (refer to An Iterative Image Registration Technique with an Application to Stereo Vision, B. D. Lucas, T. Kanade, Intl. Joint Conf. on AI, pp. 674-679, 1981).

In particular, if the LK method is used across the whole screen, global ME in which calculation execution efficiency is considerably good as compared with the block matching method can be performed.

SUMMARY OF THE INVENTION

However, with respect to the methods disclosed in JP-A-5-289159 and JP-A-2006-222933, the block matching method, in which it is necessary to obtain an MV for each block, a lot of computational resources are required, such that the block matching method is a process which generally has bad execution efficiency.

Even though the LK method can be used to perform global ME in which calculation execution efficiency is considerably good as compared with the block matching method, it is difficult to improve robustness using the same method as in JP-A-5-289159 and JP-A-2006-222933 because a local MV is not calculated in the LK method across the whole screen.

Thus, it is desirable to provide an image processing apparatus, an image processing method, an imaging apparatus, and a program capable of performing global motion estimation (ME) which is robust to a local moving object or luminance variation while preserving high calculation efficiency.

According to an embodiment of the invention, there is provided an image processing apparatus including: a global motion estimation apparatus that performs global Motion Estimation (ME) on a current image and a reference image and then outputs a Motion Vector (MV), the global motion estimation apparatus includes a motion estimation processing unit that has a function of executing a Lucas-Kanade method (hereinafter, referred to as an LK method) two or more times across a whole screen in order to perform the global motion estimation between the current image and the reference image; and the motion estimation processing unit obtains a set of motion vectors based on at least information about pixel value variation in a horizontal direction, pixel value variation in a vertical direction and pixel value variation in a time direction of a pixel, and information in which a calculation result of an arbitrary calculation expression which includes the pixel value variation in the horizontal direction, the pixel value variation in the vertical direction and the pixel value variation in the time direction is added across a whole screen in first motion estimation, and determines whether to perform addition on each pixel according to a set condition when obtaining the at least information about the pixel value variation in the horizontal direction, the pixel value variation in the vertical direction and the pixel value variation in the time direction of the pixel, and information in which the calculation result of an arbitrary expression which includes the pixel value variation in the horizontal direction, the pixel value variation in the vertical direction and the pixel value variation in the time direction, which are necessary to obtain the motion vector using the LK method, is added across the whole screen, and obtains and outputs a new set of motion vectors as a result of a second LK method when the condition is satisfied in second motion estimation.

According to another embodiment of the invention, there is provided an image processing method including the steps of: executing a Lucas-Kanade (LK) method two or more times across a whole screen in order to perform the global motion estimation between a current image and a reference image when performing global motion estimation (ME) on a current image and a reference image and then outputting an motion vector (MV); in first motion estimation, obtaining a set of motion vectors based on at least information about pixel value variation in a horizontal direction, pixel value variation in a vertical direction and pixel value variation in a time direction of a pixel, and information in which a calculation result of an arbitrary calculation expression which includes the pixel value variation in the horizontal direction, the pixel value variation in the vertical direction and the pixel value variation in the time direction is added across the whole screen, and in second motion estimation, determining whether to perform addition on each pixel according to a condition when obtaining the information about the pixel value variation in the horizontal direction, the pixel value variation in the vertical direction and the pixel value variation in the time direction of the pixel, and information in which the calculation result of an arbitrary expression which includes the pixel value variation in the horizontal direction, the pixel value variation in the vertical direction and the pixel value variation in the time direction that are necessary to obtain the motion vector using the LK method is added across the whole screen, and obtaining and outputting a new set of motion vectors as a result of a second LK method when the condition is satisfied.

According to still another embodiment of the invention, there is provided an imaging apparatus, including: an optical system that forms an object image on the solid-state imaging device; an image processing apparatus that performs an image processing on an image using the solid-state imaging device; and a global motion estimation apparatus that performs global motion estimation (ME) on a current image and a reference image and then outputs a motion vector (MV), wherein the global motion estimation apparatus includes a motion estimation processing unit that has a function of executing a Lucas-Kanade (LK) method two or more times across a whole screen in order to perform the global motion estimation between the current image and the reference image; and wherein the motion estimation processing unit obtains a set of motion vectors based on at least information about pixel value variation in a horizontal direction, pixel value variation in a vertical direction and pixel value variation in a time direction of a pixel, and information in which a calculation result of an arbitrary calculation expression which includes the pixel value variation in the horizontal direction, the pixel value variation in the vertical direction and the pixel value variation in the time direction is added across whole screen in first motion estimation, and determines whether to perform addition on each pixel according to a condition when obtaining the information about the pixel value variation in the horizontal direction, the pixel value variation in the vertical direction and the pixel value variation in the time direction of the pixel, and information in which the calculation result of an arbitrary expression which includes the pixel value variation in the horizontal direction, the pixel value variation in the vertical direction and the pixel value variation in the time direction that are necessary to obtain the motion vector using the LK method is added across the whole screen, and obtaining and outputting a new set of motion vectors as a result of a second LK method, and obtains and outputs a new set of motion vectors as a result of a second LK method when the condition is satisfied in second motion estimation.

According to yet another embodiment of the invention, there is provided a program allowing a computer to perform an image process, including the steps of: executing a Lucas-Kanade (LK) method two or more times across a whole screen in order to perform the global motion estimation between a current image and a reference image when performing global motion estimation (ME) on a current image and a reference image and then outputting a motion vector (MV); in first motion estimation, obtaining a set of motion vectors based on at least information about pixel value variation in a horizontal direction, pixel value variation in a vertical direction and pixel value variation in a time direction of a pixel, and information in which a calculation result of an arbitrary calculation expression which includes the pixel value variation in the horizontal direction, the pixel value variation in the vertical direction and the pixel value variation in the time direction is added across the whole screen, and in second motion estimation, determining whether to perform addition on each pixel according to a condition when obtaining the information about the pixel value variation in the horizontal direction, the pixel value variation in the vertical direction and the pixel value variation in the time direction of the pixel and information in which the calculation result of an arbitrary expression which includes the pixel value variation in the horizontal direction, the pixel value variation in the vertical direction and the pixel value variation in the time direction that are necessary to obtain the motion vector using the LK method is added across the whole screen, and obtaining and outputting a new set of motion vectors as a result of a second LK method when the condition is satisfied.

According to the embodiments of the present invention, global motion estimation which is robust to a local moving object or luminance variation can be performed while high calculation efficiency is preserved.

DESCRIPTION OF THE PREFERRED EMBODIMENTS

Hereinafter, embodiments of the invention will be described with reference to the drawings.

Meanwhile, the description will be made in the following order.

1. Global Motion Estimation (ME). Apparatus as Image Processing Apparatus
2. Detailed Process of Global ME Apparatus
3. Example of Configuration of Imaging Apparatus (Camera System)

<1. Global Motion Estimation (ME) Apparatus as Image Processing Apparatus>

Figure 1:
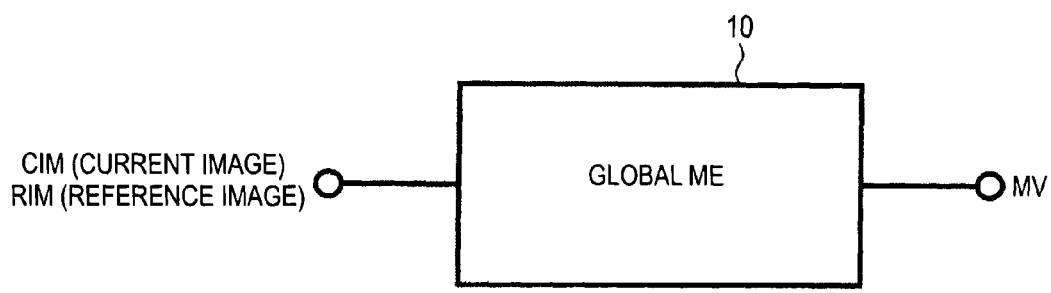
FIG. 1 is a diagram illustrating a global motion estimation apparatus included in an image processing apparatus according to an embodiment of the present invention.

FIG. 1 is a diagram illustrating a global motion estimation apparatus included in an image processing apparatus according to an embodiment of the invention.

Figure 2:
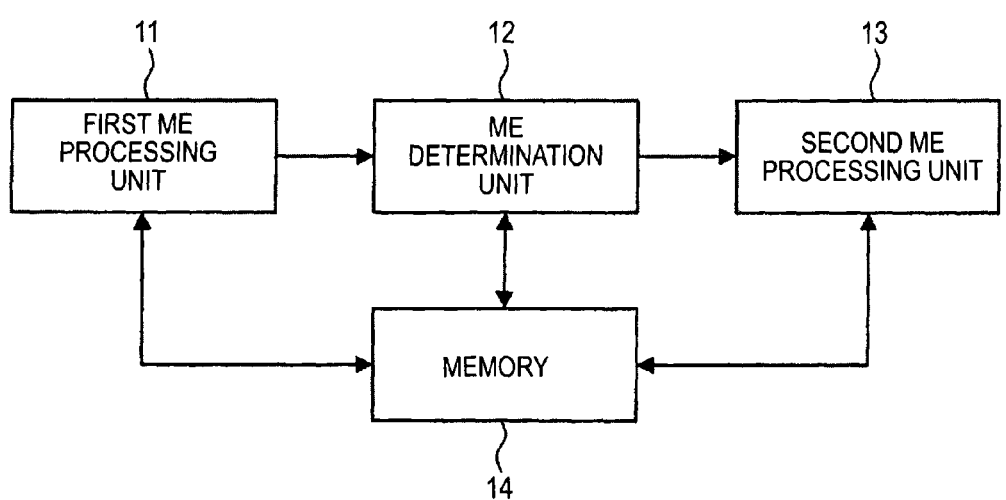
FIG. 2 is a block diagram illustrating the basic function of the global motion estimation apparatus of FIG. 1.

FIG. 2 is a block diagram illustrating the basic function of the global motion estimation apparatus of FIG. 1.

An image processing apparatus 1 according to the embodiment includes a global motion estimation (or Motion Estimation (ME)) apparatus 10.

As shown in FIG. 1, the global ME apparatus 10 basically performs a global ME process in which two images, that is, a current image CIM and a reference image RIM, are input, and a set of Motion Vectors (MVs) are output.

As shown in FIG. 2, the global ME apparatus 10 basically includes a first ME processing unit 11, an ME determination unit 12, a second ME processing unit 13 and a memory 14, as functional blocks.

In the embodiment, the global ME apparatus 10 includes a function of performing the Lucas-Kanade method (hereinafter, LK method) two or more times across the whole screen in order to perform the global ME between two images of an image sequence I (x,y,t) as follows.

[First ME]

In first ME, in addition to $\Sigma(Ix)^2$, $\Sigma(Iy)^2$, $\Sigma IxIy$, $\Sigma IxIt$, and $\Sigma IyIt$ which are necessary to obtain MVs using the LK method, a predetermined number (n) of additional values $\Sigma Fn(Ix, Iy, It)$ of a term including Ix, Iy, and It are preserved in the memory 14 as variables.

Thereafter, the first ME processing unit 11 calculates a set of $MV(v_x, v_y)$ as the result of the first LK method.

[Valid/Invalid Determination about Results of ME]

The ME determination unit 12 determines whether the ME performed by the first ME processing unit 11 is valid or invalid.

If it is determined that the ME is valid by the ME determination unit 12, the second ME processing unit 13 performs second ME. If it is determined that the ME is invalid, the MV is set to 0 and then output as described as follows.

[Second ME]

In second ME, when $\Sigma(I'x)^2$, $\Sigma(I'y)^2$, $\Sigma I'xI'y$, and $\Sigma I'xI't$, $\Sigma I'yI't$ which are necessary to obtain MVs using the LK method are obtained, it is determined whether addition is performed or not on each pixel.

Here, a conditional expression, including variables below, is used to determine a condition.

First, I'x, I'y, and I't of a corresponding pixel.

Second, $\Sigma(Ix)^2$, $\Sigma(Iy)^2$, $\Sigma IxIy$, $\Sigma IxIt$, $\Sigma IyIt$ and MV(vx,vy) obtained at the first ME.

Third, the additional value $\Sigma Fn(Ix,Iy,It)$ obtained at the first ME.

Fourth, a threshold parameter.

A set of MV($v'_x, v'_y$) is newly calculated as the result of the second LK method and then is output.

In the above description, Ix, Iy, and It respectively indicate "pixel value variation in the horizontal direction", "pixel value variation in the vertical direction", and "pixel value variation in the time direction", of the corresponding pixel. $\Sigma$ indicates addition performed across the whole screen.

Therefore, $\Sigma Fn(Ix, Iy, It)$ can be represented as the "addition performed across the whole screen with respect to the result of calculation of an arbitrary calculation expression which includes the pixel value variation in the horizontal direction, the pixel value variation in the vertical direction and the pixel value variation in the time direction".

In order to distinguish first calculation from second calculation, the symbol I' is used for an image which has been read for the second time. However, since the LK method is performed two times on the same image pair, I is actually equal to I'. However, the value of $(v_x, v_y)$ is different from the value of $(v'_x, v'_y)$.

[Detailed Example of Valid/Invalid Determination about Results of ME]

The ME determination unit 12 receives MV ($v_x$, $v_y$) obtained by the first ME processing unit 11, and determines invalid ME (MV is 0) when it is determined that the difficulty level of the global ME is high.

In this case, it is not necessary to perform a second LK method by the second ME processing unit 13.

Here, a conditional expression, including variables below, is used to determine a condition.

First, $\Sigma(Ix)^2$, $\Sigma(Iy)^2$, $\Sigma IxIy$, $\Sigma IxIt$, $\Sigma IyIt$, and MV($v_x,v_y$) obtained at the first ME.

Second, additional value $\Sigma Fn(Ix,Iy,It)$ obtained at the first ME.

Third, a threshold parameter.

Here, four values, that is, $\Sigma Ix$, $\Sigma Iy$, $\Sigma It$, and $\Sigma(It)^2$, are introduced as the additional value $\Sigma Fn(Ix,Iy,It)$, and the standard deviation of the distribution of the error function value of the LK method across the entire screen is calculated.

Thereafter, whether the result of the calculation is larger than a predetermined threshold is regarded as one of the conditional expressions, and it is determined that ME is invalid when the conditional expression is realized.

Further, $\Sigma It$ is used as the additional value $\Sigma Fn(Ix,Iy,It)$, and the absolute value of the pixel value variation in the time direction for a single pixel is calculated. Whether the result of the calculation is larger than a predetermined threshold is regarded as one of the conditional expressions, and it is determined that ME is invalid when the conditional expression is realized.

Further, in the second ME process, the following process can be performed.

Four values, that is, $\Sigma Ix$, $\Sigma Iy$, $\Sigma It$, and $\Sigma(It))^2$, are used as the additional value $\Sigma Fn(Ix,Iy,It)$, and the average and standard deviation of the distribution across the whole screen of the error function value of the LK method is calculated.

Thereafter, an outlier degree is calculated from the error function value of each pixel based on the average and the standard deviation. Whether the outlier degree is larger than a predetermined threshold is regarded as one of the conditional expressions, and the corresponding pixel is not included in the MV calculation when the conditional expression is realized.

Further, in the second ME process, the following process can be performed.

Two values, that is, $\Sigma Ix$ and $\Sigma(It)^2$, are used as the additional value $\Sigma Fn(Ix,Iy,It)$, and the average and standard deviation of the distribution across the whole screen of the pixel value variation in the time direction is calculated.

Thereafter, an outlier degree is calculated from the pixel value variation of each pixel based on the average and the standard deviation. Whether the outlier degree is larger than a predetermined threshold is regarded as one of the conditional expressions, and the corresponding pixel is not included in the MV calculation when the conditional expression is realized.

<2. Detailed Process of Global ME Apparatus>

Hereinafter, the detailed process of the global ME apparatus 10 will be described with reference to FIGS. 3 to 7.

Figure 3:
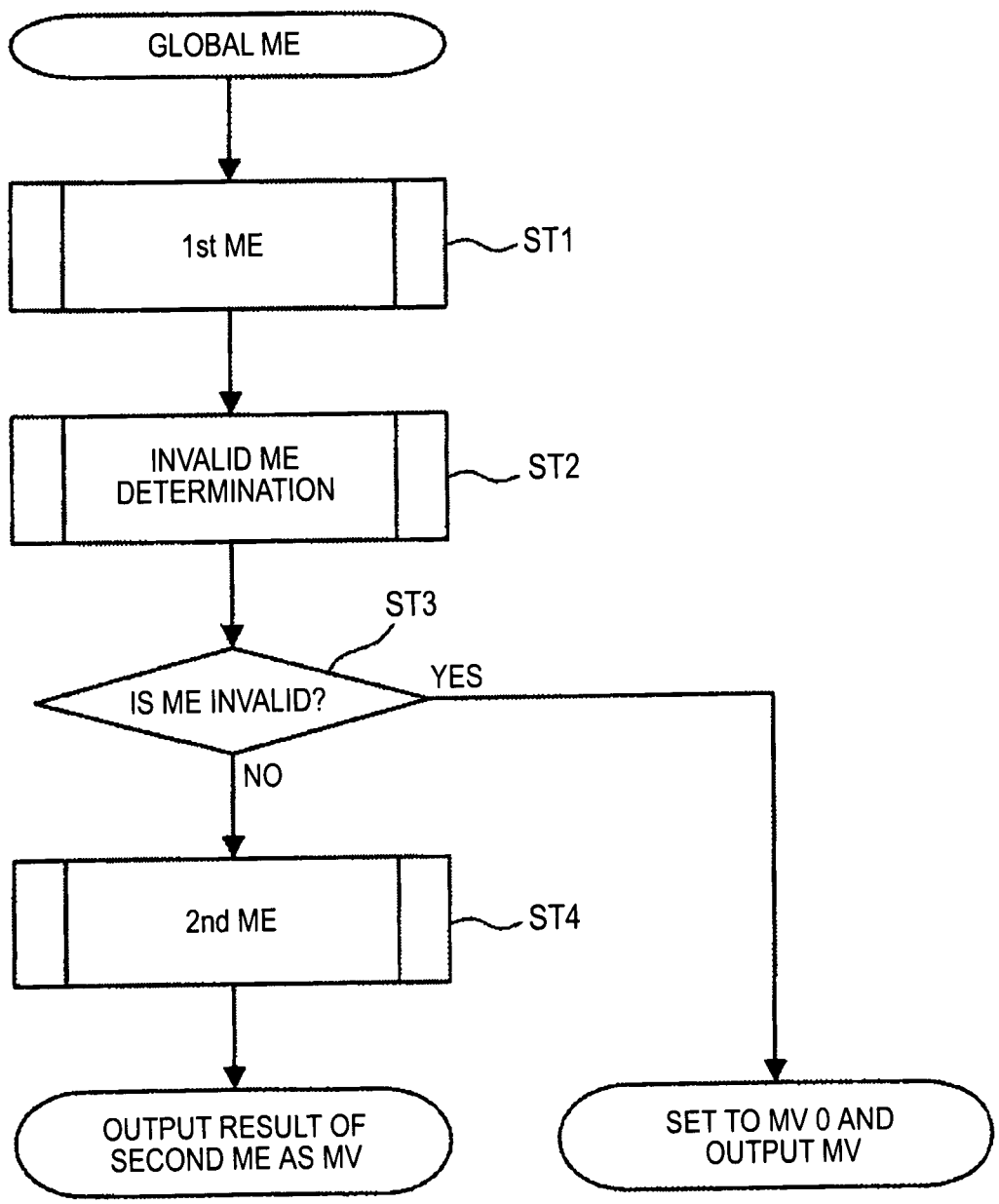
FIG. 3 is a flowchart illustrating the overview of a global ME processing procedure according to an embodiment of the invention.

FIG. 3 is a flowchart illustrating the overview of a whole global ME processing procedure according to an embodiment of the invention.

[Step ST1]

First, first ME is performed at step ST1.

[Steps ST2 and ST3]

The difficulty level and reliability of global ME are determined based on the result of the first ME, and it is determined whether the ME is valid or not at steps ST2 and ST3.

[Step ST4]

When the ME is invalid at step ST3, the process is branched, so that an MV is set to 0 and then the MV is output, and the process is terminated. When the ME is valid, the second ME is performed at step ST4, an MV corresponding to the result of the second ME is output, and the process is terminated.

When the ME is invalid, the second ME is not performed, so that the mistakable use of an undesirable MV can be prevented and throughput can be reduced.

Figure 4:
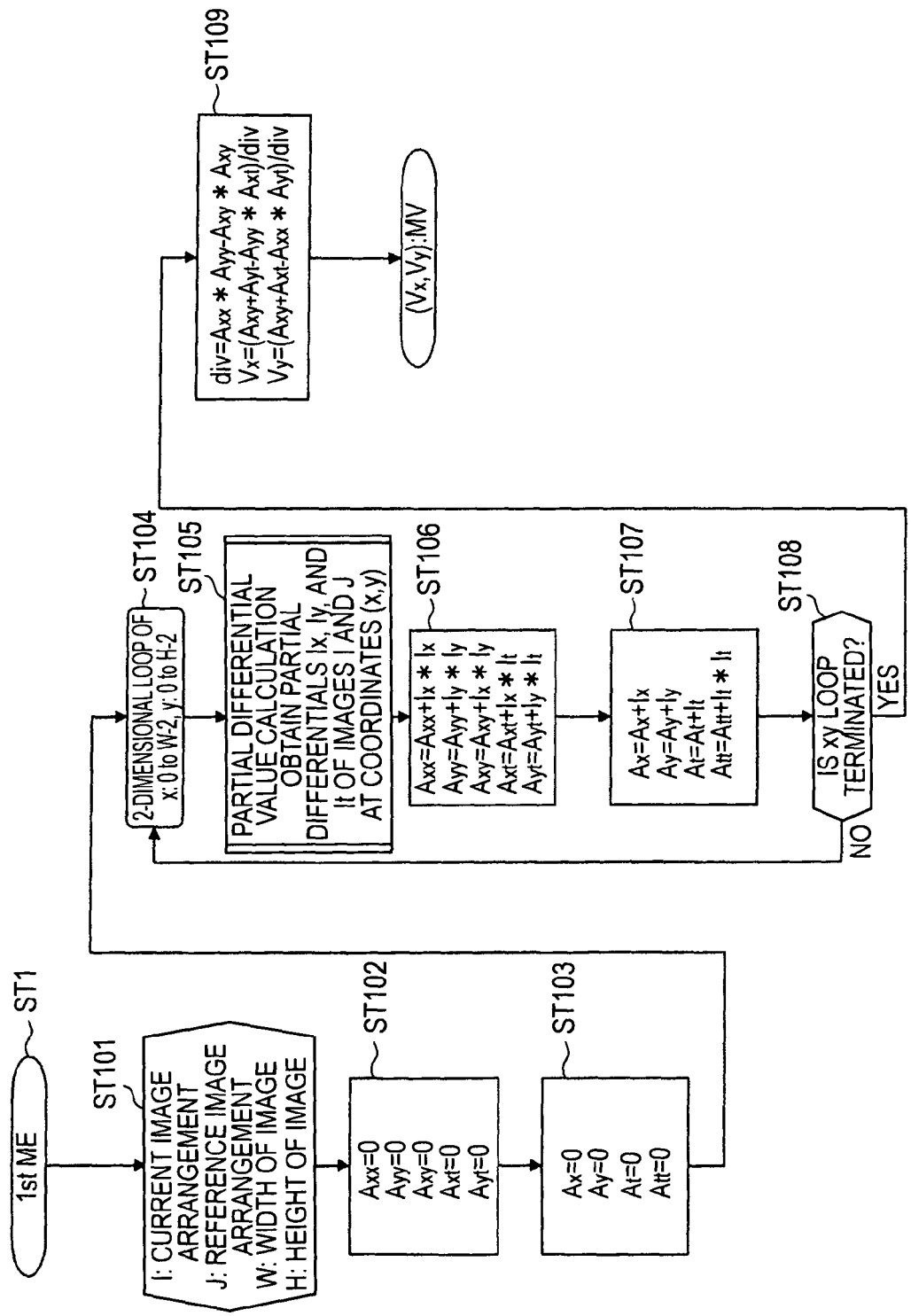
FIG. 4 is a flowchart illustrating a first ME procedure according to an embodiment of the invention.

FIG. 4 is a flowchart illustrating a first ME procedure according to an embodiment of the invention.

The ME process of FIG. 4 is performed in such a way that the Lucas-Kanade (LK) method is augmented, and, basically, an MV is obtained according to the following equation.

$$v_x = \frac{\Sigma I_x I_y \Sigma I_y I_t - \Sigma(I_y)^2 \Sigma I_x I_t}{\Sigma(I_x)^2 \Sigma(I_y)^2 - (\Sigma I_x I_y)^2}$$

$$v_y = \frac{\Sigma I_x I_y \Sigma I_x I_t - \Sigma(I_x)^2 \Sigma I_y I_t}{\Sigma(I_x)^2 \Sigma(I_y)^2 - (\Sigma I_x I_y)^2}.$$

Figure 5:
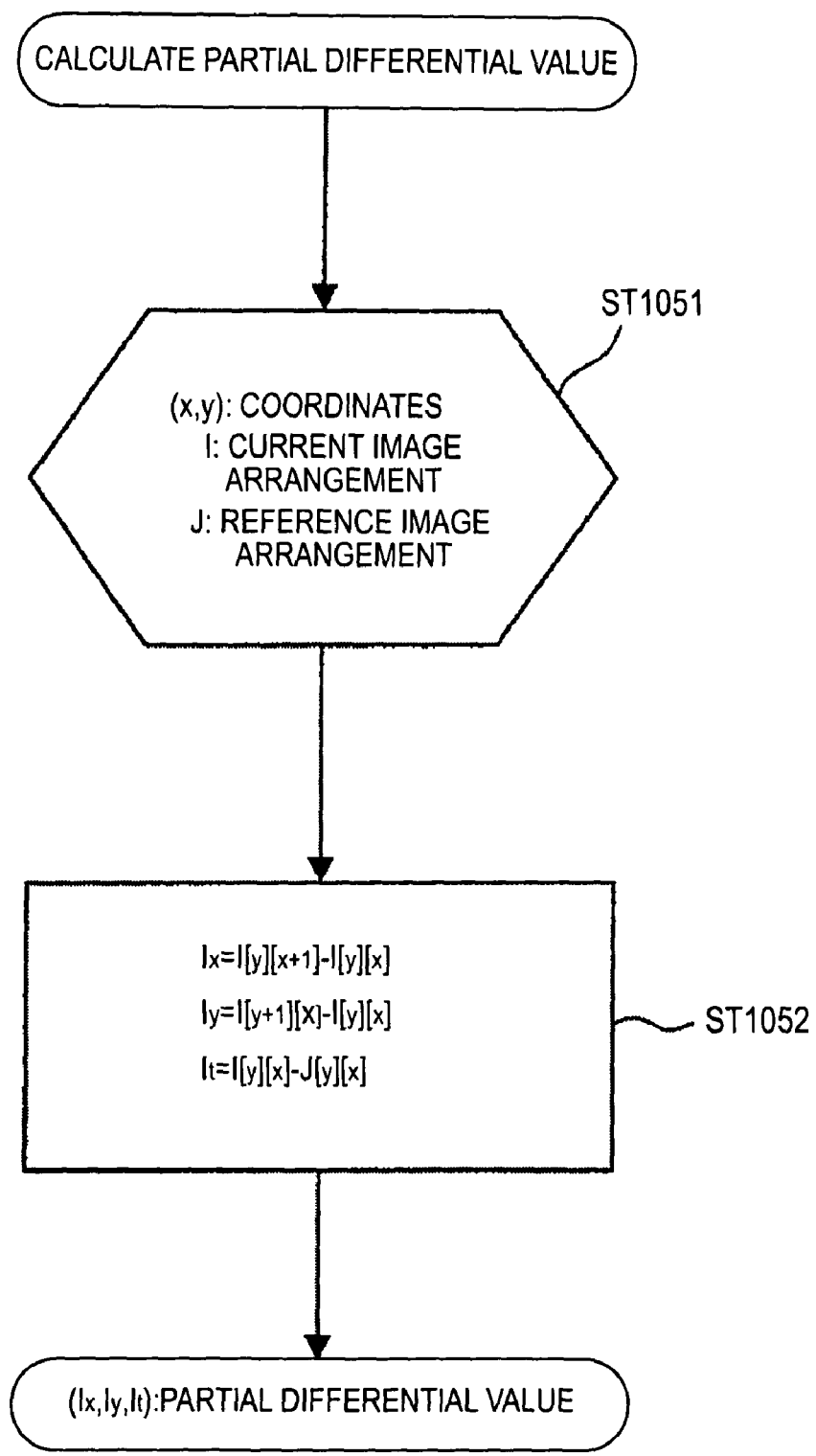
FIG. 5 is a view illustrating an example of partial differential calculation at step ST105 of FIG. 4.

In the above Equation, $\Sigma$ represents sum across the whole screen. Further, Ix, Iy, and It represent respective partial differential values in the horizontal, vertical, and time directions of the image sequence I(x,y,t) as described above. Even though there are various calculation methods, the calculation shown in the flowchart of FIG. 5 is performed as an example.

$\Sigma(Ix)^2$, $\Sigma(Iy)^2$, $\Sigma IxIy$, $\Sigma IxIt$, and $\Sigma IyIt$ which are the results of the calculation on the way are preserved in an arbitrary storage range (Axx, Ayy, Axy, Axt, and Ayt in FIG. 4) in order to be used in subsequent invalid ME determination or second ME below.

Further, ΣIx, ΣIy, ΣIt, and Σ(It)² which are fundamentally not necessary for the LK method are calculated and preserved in the same manner (Ax, Ay, At, and Att in FIG. 4).

[Step ST101]

Current image arrangement I and reference image arrangement J are received, and the width W and high H of each of the images are obtained at step ST101.

[Step ST102]

The parameters Axx, Ayy, Axy, Axt, and Ayt corresponding to Σ(Ix)², Σ(Iy)², ΣIxIy, ΣIxIt, and ΣIyIt are set to be an initial value of 0 at step ST102.

[Step ST103]

The parameters Ax, Ay, At, and Att corresponding to ΣIx, ΣIy, ΣIt, and Σ(It)² are set to be an initial value of 0 at step ST103.

[Step ST104]

A two dimensional loop is started by specifying a coordinate x ranging from 0 to W-2, and a coordinate y ranging from 0 to H-2 at step ST104.

[Step ST105]

The partial differentials Ix, Iy, and It of the current image I and the reference image J at the coordinates (x,y) are obtained at step ST105.

FIG. 5 is a view illustrating an example of the partial differential calculation at step ST105 of FIG. 4.

The current image I and the reference image J at the coordinates (x,y) are obtained at step ST1051, and the partial differentials Ix, Iy, and It of the corresponding images are obtained at step ST1052.

In this case, Ix=I[y][x+1]−I[y][x]
Iy=I[y+1][x]−I[y][x]
It=I[y][x]−I[y][x]

[step ST106]

At step ST106, the parameter Axx corresponding to Σ(Ix)² is obtained by Axx+Ix*Ix.

The parameter Ayy corresponding to Σ(Iy)² is obtained by Ayy+Iy*Iy.

The parameter Axy corresponding to ΣIxIy is obtained by Axy+Ix*Iy.

The parameter Axt corresponding to ΣIxIt is obtained by Axt+Ix*It.

The parameter Ayt corresponding to ΣIyIt is obtained by Ayt+Iy*It.

[Step ST107]

At step ST107, the parameter Ax corresponding to ΣIx is obtained by Ax+Ix.

The parameter Ay corresponding to ΣIy is obtained by Ay+Iy.

The parameter At corresponding to ΣIt is obtained by At+It.

The parameter Att corresponding to Σ(It)² is obtained by Att+It*It.

[Step ST108]

It is determined whether the xy loop is terminated or not at step ST108. When the xy loop is not terminated, the process returns to step ST 104. When the xy loop is terminated, the process proceeds to the process at step ST109.

[Step ST109]

The MV($v_x,v_y$) is obtained and then output to the ME determination unit 12 at step ST109.

At this time, an MV($v_x$) is obtained using $v_x$=(Axy+Ayt−Ayy*Axt)/div.

An MV($v_y$) is obtained using $v_y$=(Axy+Axt−Axx*Ayt)/div.

Here, div is Axx*Axt−Axx*Axy.

Figure 6:
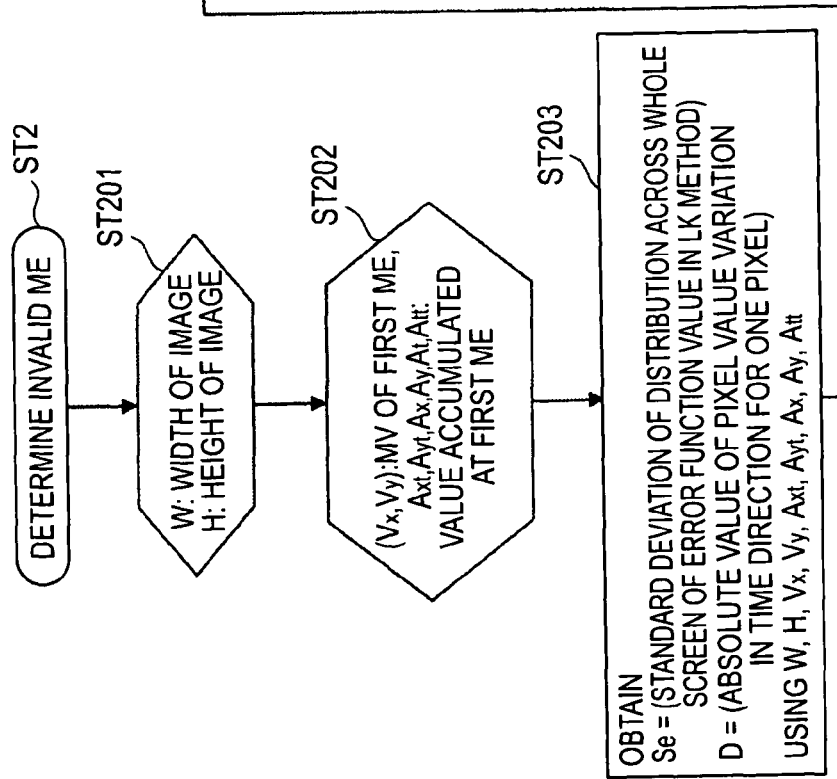
FIG. 6 is a flowchart illustrating a valid/invalid ME determination procedure according to an embodiment of the invention.

FIG. 6 is a flowchart illustrating a valid/invalid ME determination procedure according to an embodiment.

[Step ST201]

The information about the width W and height H of each of the images is obtained at step ST201.

[Step ST202]

An MV($v_x,v_y$) is obtained by performing first ME, and the accumulation value of the parameter values Axt(ΣIxIt), Ayt(ΣIyIt), Ax(ΣIx), Ay(ΣIy), At(ΣIt), and Att(Σ(It)²) of the first ME is obtained at step ST202.

[Step ST203]

A standard deviation σe(Se) and an absolute value δ(D) are obtained using the result of the above-described first ME process at step ST203.

Meanwhile, σe represents the standard deviation of the distribution across the whole screen of an error function value in the LK method, and the absolute value δ(D) represents the absolute value of the pixel value variation in the time direction for a single pixel.

[Step ST204]

Threshold determination is performed on the standard deviation σe(Se) using a preset threshold parameter at step ST204.

[Step ST205]

If, as the result of the threshold determination, it is determined that the standard deviation σe(Se) is higher than the threshold at step ST205, it is determined that the ME is invalid and the process is terminated.

[Step ST206]

If it is determined that the standard deviation σe(Se) is lower than the threshold, the threshold determination is performed on the absolute value δ(D) using the preset threshold parameter at step ST206.

[Step ST207]

If, as the result of the threshold determination, it is determined that the absolute value δ(D) is higher than the threshold at step ST207, it is determined that the ME is invalid and the process is terminated.

If it is determined that the absolute value δ(D) is lower than the threshold, it is determined that the first ME is valid.

The mistakable use of an undesirable MV, which is subject to be output when the local motion in the screen is too large, can be prevented by determining the threshold of the standard deviation σe(Se).

In the same manner, the mistakable use of an undesirable MV, which is subject to be output when the illumination variation in the screen is too large, can be prevented by determining the threshold of the absolute value δ(D).

Meanwhile, when threshold determination is performed, a preferable result can be obtained by performing threshold comparison after performing averaging filtering using the previous standard deviation σe(Se) (the same as in the absolute value δ(D)). Furthermore, a preferable result can be obtained by performing threshold comparison having hysteresis.

Figure 7:
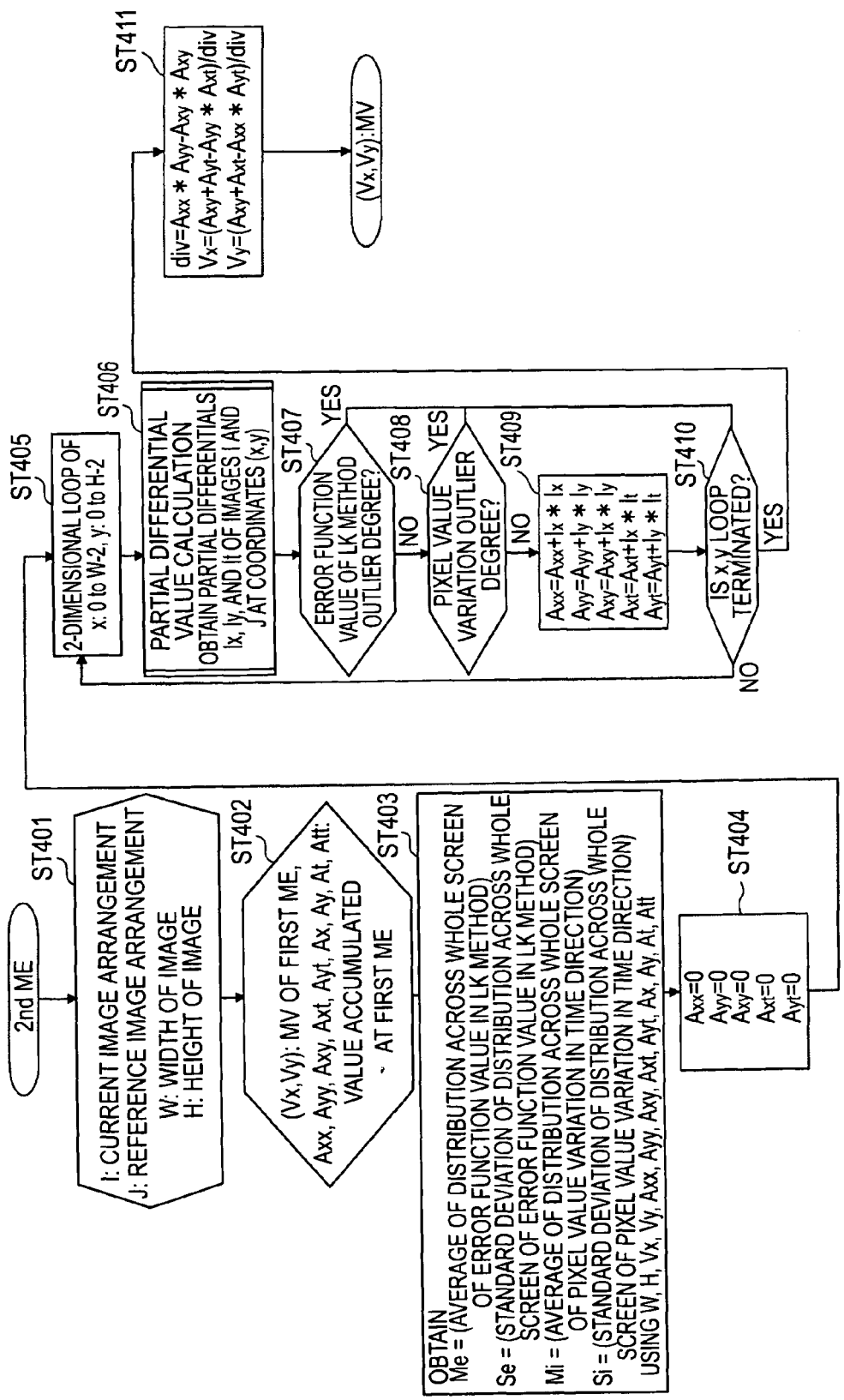
FIG. 7 is a flowchart illustrating a second ME procedure according to an embodiment of the invention.

FIG. 7 is a flowchart illustrating a second ME procedure according to an embodiment.

Although the second ME is a process of augmenting the Lucas-Kanade (LK) method and of basically obtaining an MV($v_x,v_y$) as in the first ME, the second ME is different from the first ME in that Σ, that is, "addition across the whole screen", is not performed on a specific pixel.

In order to determine the specific pixel which is not used in the calculation, the following is first obtained using the results of the first ME($v_x$, $v_y$, $\Sigma Ix$, $\Sigma Iy$, $\Sigma It$, and $\Sigma(It)^2$) at step ST403.

The average $\mu e(Me)$ of the distribution across the whole screen of the error function value of the LK method and the standard deviation $\sigma e(Se)$ of the distribution across the whole screen of the error function value of the LK method are obtained. Furthermore, the average $\mu i(Mi)$ of the distribution across the whole screen of the pixel value variation in the time direction and the standard deviation Si of the distribution across the whole screen of the pixel value variation in the time direction are obtained.

Furthermore, in the loop in which $\Sigma(I'x)^2$, $\Sigma(I'y)^2$, $\Sigma I'xI'y$, $\Sigma I'xI't$, and $\Sigma I'yI't$ are newly obtained at steps ST405 to ST410, the conditional branching in order to estimate the following conditional expressions are introduced at steps ST407 and ST408.

After calculating the partial differentials, the outlier degree is calculated from the error function value of each pixel based on the average $\mu e(Me)$ and standard deviation $\sigma e(Se)$ of the distribution.

Thereafter, it is determined whether the result of the calculation is larger than a predetermined threshold.

Further, the outlier degree is calculated from the pixel value variation of each pixel based on the average $\mu i(Mi)$ of the distribution and the standard deviation Si of the distribution.

Thereafter, it is determined whether the result of the calculation is larger than a predetermined threshold.

Here, I'x, I'y, and I't are not used in the first ME but are partial differential values of each pixel obtained at step ST406 in the second ME loop.

However, the LK method is performed only two times on the same image pair, so that, actually, I=I'.

As shown at steps ST407 and ST408, when one of or both of the conditions are realized, $\Sigma$ is not calculated and the process proceeds to a next pixel.

Therefore, the local motion or brightness variation functioning as noise can be removed to some extent, and preferable results as the global MV can be obtained.

Meanwhile, the following is the variation which can be easily estimated and is included in the invention.

Although the number of repetition of ME is limited to two times, the embodiment can be applied even when the number of repeat ion is increased.

In addition to the MV estimation including only translation motion components, a version applied to affine parameter estimation including rotational enlargement or projective transform matrix estimation may be applied.

As described above, according to the embodiment, while preserving the high calculation execution efficiency of the Lucas-Kanade (LK) method, global ME which is robust to a local moving object or luminance variation can be performed.

In particular, when the embodiment is applied to a DIS, the global ME can be performed using only the reduction images of input images, so that the embodiment can be realized using less computational resource.

When a block matching method is used, ordinarily dedicated hardware is often used. However, according to the method according to the embodiment, a general image reduction circuit, a general memory, and a processor are enough.

The solid-state imaging device having the above-described advantage can be applied to a digital camera or a video camera as an imaging device.

<3. Example of Configuration of Imaging Apparatus (Camera System)>

Figure 8:
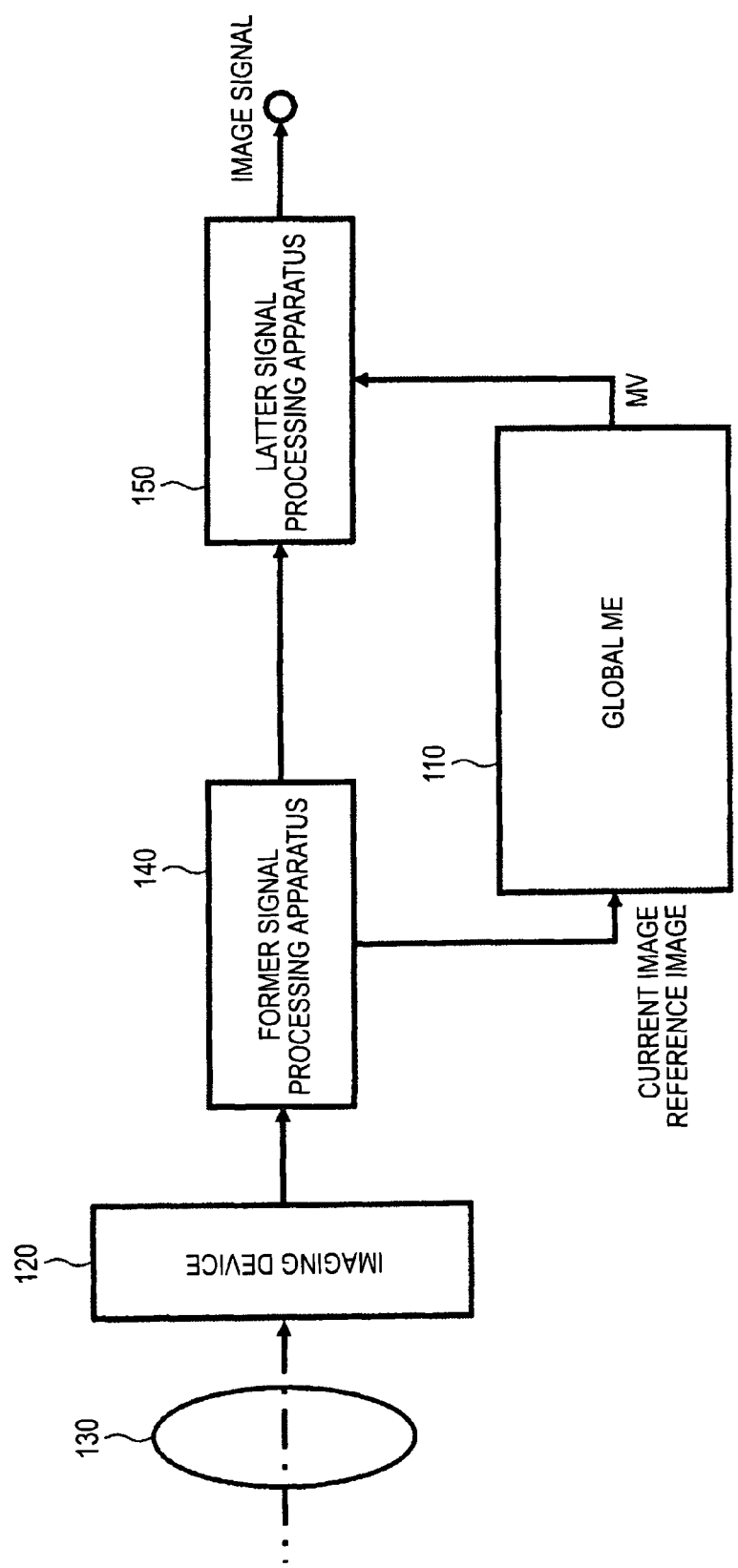
FIG. 8 is a view illustrating an example of the configuration of an imaging apparatus (camera system) which uses the image processing apparatus according to an embodiment of the invention.

FIG. 8 is a view illustrating an example of the configuration of an imaging apparatus (camera system) which uses the image processing apparatus according to the embodiment of the invention.

A global ME apparatus 110 according to the embodiment is applied to the imaging apparatus 100.

Further, the imaging apparatus 100 includes an optical system that guides incident light to the pixel region (focuses on an object image) of an imaging device 120, such as a Complementary Metal-Oxide-Semiconductor (CMOS) image sensor, for example, includes a lens 230 that focuses incident light (image light) on an imaging surface.

The imaging apparatus 100 further includes a former signal processing device 140 and a latter signal processing device 150.

In the imaging apparatus 100, an image signal captured by a lens system 130 and the imaging device 120 is processed by the former signal processing device 140, so that pixel value signals for two sequences are generated.

With respect to the former signal processing device 140, the current image and the reference image are sequentially provided to the global ME apparatus 110 in response to a single pixel value signal, so that a motion vector is output. The pixel value signal in another direction is processed by the latter signal processing device 150 using the motion vector thereof, and then a resulting signal is output as an image signal.

Figure 9:
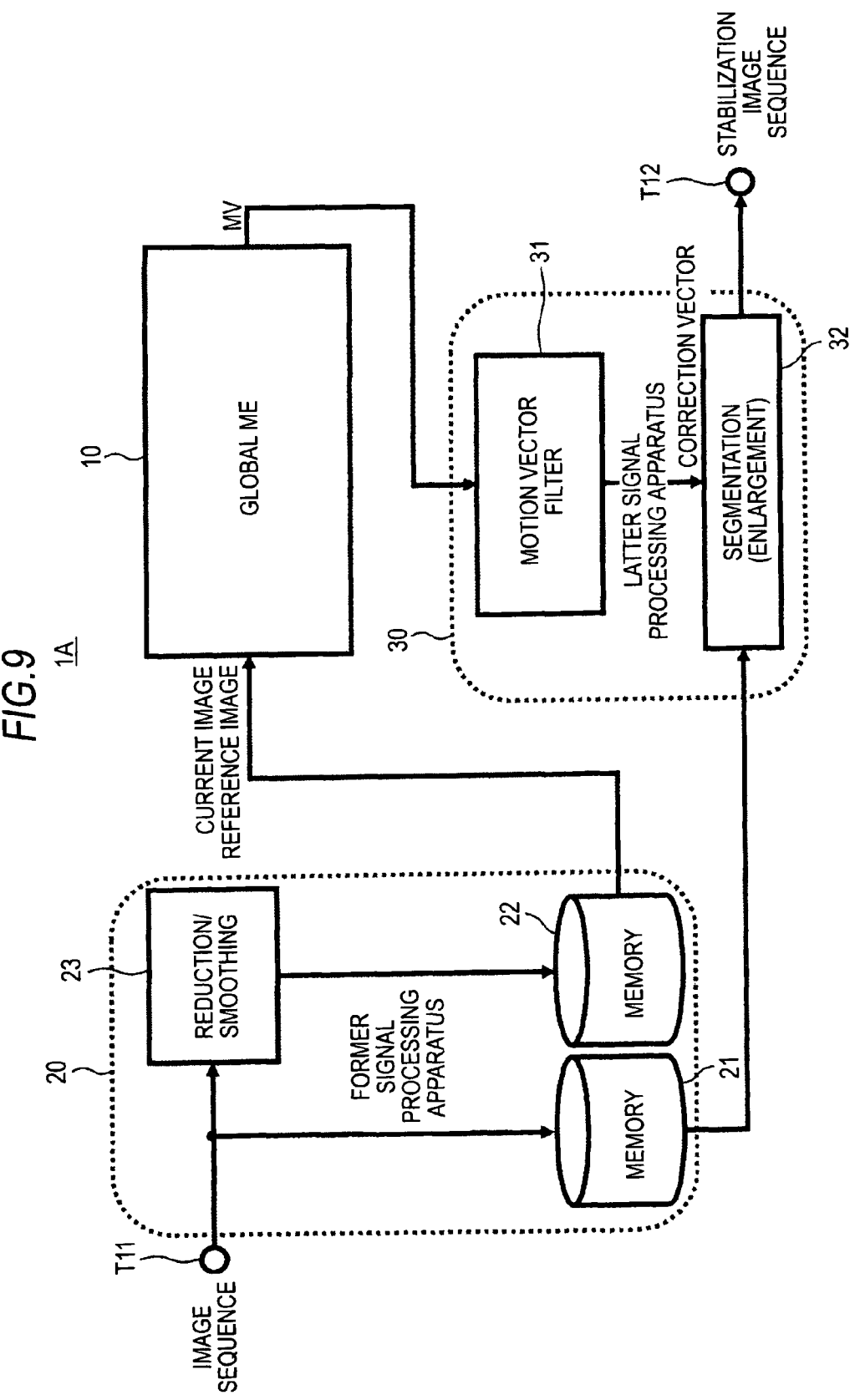
FIG. 9 is a view illustrating an example of a configuration when the global motion estimation apparatus according to an embodiment of the invention is applied to an image processing apparatus which includes an image stabilizing function (Digital Image Stabilizer (DIS)).

FIG. 9 is a view illustrating an example of a configuration when a global ME apparatus according to an embodiment of the invention is applied to an image processing apparatus which includes an image stabilizing (DIS) function.

An image processing apparatus 1A includes a former signal processing device 20 and a latter signal processing device 30 in addition to a global ME apparatus 10.

The former signal processing device 20 includes memories 21 and 22 and a reducing/smoothing circuit 23.

The latter signal processing device 30 includes a Motion Vector (MV) filter 31 and a segmentation unit 32.

In the image processing apparatus 1A, an image sequence is obtained from an input terminal T11.

The images are received one by one, and stored in the memory 21 without change in one path.

The reason for this is to chiefly synchronize time-delay and output in an ME path. In the other path, the reducing/smoothing circuit 23 performs a reducing/smoothing process on the images and the processed images are stored in the memory 22.

The calculation amount of the global ME is reduced by performing a reducing process, and a highly accurate noise-resistant MV can be obtained by combining the reducing process with a smoothing process.

Thereafter, the reduced/smoothed image (current image) of the latest input image and one previous reduced/smoothed image (reference image) are read out from the memory 22, and they are input to the above-described global ME apparatus 10.

The MV obtained as the result of the global ME is converted into a correction vector through a motion vector filter 31.

In the most simple case, the filter 31 performs integration filtering (the input MV sequence is sequentially added).

Finally, the newest input image is read out from the memory 21, and segmentation/enlargement (or simply segmentation) is performed according to the correction vector by segmentation unit 32, so that a stabilized image sequence on which image stabilizing has been performed is generated, and the image sequence is output from a terminal T12.

Meanwhile, the embodiment of the invention can be applied to any one which performs motion estimation/alignment on the entire screen in addition to the DIS as shown in FIG. 9.

For example, the embodiment of the invention may be applied to stereo vision matching, super resolution, 3-dimensional noise reduction, panorama stitching, panning (making a moving object into still images), and video coding.

The invention is not limited to the above-described embodiment, and arbitrary modifications are possible without departing from the gist of the invention.

Further, the method described above in detail can be formed as a program based on the procedures, and can be configured to be executed by a computer such as a CPU.

Further, such a program is configured to be accessed by a recording medium, such as a semiconductor memory, a magnetic disk, an optical disc or a floppy disc (registered trademark), or by a computer in which the recording medium is set, so that the program is executed.

The present application contains subject matter related to that disclosed in Japanese Priority Patent Application JP 2010-104353 filed in the Japan Patent Office on Apr. 28, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a global motion estimation apparatus that performs global Motion Estimation (ME) on a current image and a reference image and then outputs a Motion Vector (MV),
   wherein the global motion estimation apparatus includes a motion estimation processing unit that has a function of executing a Lucas-Kanade method (hereinafter, referred to as an LK method) two or more times across a whole screen in order to perform the global motion estimation between the current image and the reference image; and
   the motion estimation processing unit
      obtains a set of motion vectors based on at least information about pixel value variation in a horizontal direction, pixel value variation in a vertical direction and pixel value variation in a time direction of a pixel, and information in which a calculation result of an arbitrary calculation expression which includes the pixel value variation in the horizontal direction, the pixel value variation in the vertical direction and the pixel value variation in the time direction is added across a whole screen in first motion estimation, and
      determines whether to perform addition on each pixel according to a set condition when obtaining the at least information about the pixel value variation in the horizontal direction, the pixel value variation in the vertical direction and the pixel value variation in the time direction of the pixel, and information in which the calculation result of an arbitrary expression which includes the pixel value variation in the horizontal direction, the pixel value variation in the vertical direction and the pixel value variation in the time direction, which are necessary to obtain the motion vector using the LK method, is added across the whole screen, and obtains and outputs a new set of motion vectors as a result of a second LK method when the condition is satisfied in second motion estimation.

2. The image processing apparatus according to claim 1,
   wherein the condition used to set the determination whether to perform addition on each pixel in the second motion estimation includes at least one of
   the information about the pixel value variation in the horizontal direction, the pixel value variation in the vertical direction and the pixel value variation in the time direction of the corresponding pixel;
   an additional value across the whole screen of the information about the pixel value variation in the horizontal direction, the pixel value variation in the vertical direction and the pixel value variation in the time direction of the corresponding pixel, the information being obtained in the first motion estimation;
   a motion vector; and
   a threshold parameter to be set.

3. The image processing apparatus according to claim 1,
   wherein the global motion estimation apparatus includes a determination unit that determines whether a result of the first motion estimation is valid or invalid, and
   the determination unit determines that the first motion estimation is invalid when it is determined that a difficulty level of the global motion estimation is high.

4. The image processing apparatus according to claim 3,
   wherein the condition used for the determination unit to determine whether the result of the first motion estimation is valid or invalid includes at least any one of:
   the additional value across the whole screen of the information about the pixel value variation in the horizontal direction, the pixel value variation in the vertical direction and the pixel value variation in the time direction, the information being obtained in the first motion estimation;
   the motion vector; and
   the threshold parameter to be set.

5. The image processing apparatus according to claim 4,
   wherein the determination unit
   uses the additional value across the whole screen of the information about the pixel value variation in the horizontal direction, the pixel value variation in the vertical direction, and the pixel value variation in the time direction as the condition for determination;
   obtains a standard deviation of distribution across the whole screen of an error function value of the LK method; and
   sets whether the standard deviation is larger than a threshold as one of the conditions and determines that the first motion estimation is invalid when the condition is satisfied.

6. The image processing apparatus according to claim 4,
   wherein the determination unit
   uses the additional value across the whole screen of the information about the pixel value variation in the time direction as the determining condition;
   obtains an absolute value of the pixel value variation in the time direction for each pixel; and
   sets whether the absolute value is larger than a threshold as one of the conditions and determines that the first motion estimation is invalid when the corresponding condition is satisfied.

7. The image processing apparatus according to claim 4,
   wherein the global motion estimation apparatus does not perform second motion estimation when the first motion estimation is invalid.

8. The image processing apparatus according to claim 1, wherein the motion estimation processing unit,
  in the second motion estimation, uses the additional value across the whole screen of the information about the pixel value variation in the horizontal direction, the pixel value variation in the vertical direction, and the pixel value variation in the time direction;
  obtains an average and the standard deviation of the distribution across the whole screen of the error function value of the LK method;
  obtains an outlier degree from the error function value of the each pixel based on the obtained average and the standard deviation;
  sets whether the obtained outlier degree value is larger than a threshold as one of the conditions and determines that a corresponding pixel is not used in calculation of the motion vector when the condition is satisfied.

9. The image processing apparatus according to claim 1, wherein the motion estimation processing unit
  uses the additional value across the whole screen of the information about the pixel value variation in the time direction in the second motion estimation;
  obtains an average and the standard deviation of the distribution across the whole screen of the pixel value variation of the LK method;
  obtains an outlier degree from the error function value of the each pixel based on the obtained average and the standard deviation; and
  sets whether the obtained outlier degree value is larger than a threshold as one of the conditions; and determines that a corresponding pixel is not used in calculation of the motion vector when the condition is satisfied.

10. The image processing apparatus according to claim 1, further comprising:
  a former signal processing unit that outputs a pixel value signal, which has been reduced and smoothen in a former signal process, to the global motion estimation apparatus; and
  a latter signal processing unit that temporally digital filters the motion vector output of the global motion estimation apparatus to obtain a correction vector, and that cut out a portion corresponding to a predetermined ratio size from original input images according to a position represented by the correction vector.

11. An image processing method comprising the steps of:
  executing a Lucas-Kanade (LK) method two or more times across a whole screen in order to perform the global motion estimation between a current image and a reference image when performing global motion estimation (ME) on a current image and a reference image and then outputting an motion vector (MV);
  in first motion estimation, obtaining a set of motion vectors based on at least information about pixel value variation in a horizontal direction, pixel value variation in a vertical direction and pixel value variation in a time direction of a pixel, and information in which a calculation result of an arbitrary calculation expression which includes the pixel value variation in the horizontal direction, the pixel value variation in the vertical direction and the pixel value variation in the time direction is added across the whole screen, and
  in second motion estimation, determining whether to perform addition on each pixel according to a condition when obtaining the information about the pixel value variation in the horizontal direction, the pixel value variation in the vertical direction and the pixel value variation in the time direction of the pixel, and information in which the calculation result of an arbitrary expression which includes the pixel value variation in the horizontal direction, the pixel value variation in the vertical direction and the pixel value variation in the time direction that are necessary to obtain the motion vector using the LK method is added across the whole screen, and obtaining and outputting a new set of motion vectors as a result of a second LK method when the condition is satisfied.

12. The image processing method according to claim 11, wherein the condition used to set the determination whether to perform addition on each pixel in the second motion estimation includes at least one of
  the information about the pixel value variation in the horizontal direction, the pixel value variation in the vertical direction and the pixel value variation in the time direction of the corresponding pixel;
  an additional value across the whole screen of the information about the pixel value variation in the horizontal direction, the pixel value variation in the vertical direction and the pixel value variation in the time direction of the corresponding pixel, the information being obtained in the first motion estimation;
  a motion vector; and
  a threshold parameter to be set.

13. The image processing method according to claim 11, further comprising the steps of:
  determining whether a result of the first motion estimation is valid or invalid; and
  determining that the first motion estimation is invalid when it is determined that a difficulty level of the global motion estimation is high.

14. The image processing method according to claim 13, wherein the condition used to determine whether the result of the first motion estimation is valid or invalid, includes at least any one of:
  the additional value across the whole screen of the information about the pixel value variation in the horizontal direction, the pixel value variation in the vertical direction and the pixel value variation in the time direction, the information being obtained in the first motion estimation;
  the motion vector; and
  the threshold parameter to be set.

15. The image processing method according to claim 14, further comprising the steps of:
  using the additional value across the whole screen of the information about the pixel value variation in the horizontal direction, the pixel value variation in the vertical direction, and the pixel value variation in the time direction as the condition for determination;
  obtaining a standard deviation of distribution across the whole screen of an error function value of the LK method;
  setting whether the standard deviation is larger than a threshold as one of the conditions and determining that the first motion estimation is invalid when the condition is satisfied.

16. The image processing method according to claim 14, further comprising the steps of:
  using the additional value across the whole screen of the information about the pixel value variation in the time direction as the determining condition;
  obtaining an absolute value of the pixel value variation in the time direction for each pixel;

setting whether the absolute value is larger than a threshold as one of the conditions; and determining that the first motion estimation is invalid when the corresponding condition is satisfied.

17. The image processing method according to claim 11, further comprising the steps of:

in second motion estimation, using the additional value across the whole screen of the information about the pixel value variation in the horizontal direction, the pixel value variation in the vertical direction, and the pixel value variation in the time direction;

obtaining an average and standard deviation of distribution across the whole screen of the error function value of the LK method;

setting whether an obtained outlier degree value is larger than a threshold as one of the conditions and determining that a corresponding pixel is not included in the calculation of the motion vector when the corresponding condition is satisfied.

18. The image processing method according to claim 11, further comprising the steps of:

in the second motion estimation, using the additional value across the whole screen of the information about the pixel value variation in the time direction;

obtaining the average and standard deviation of the distribution across the whole screen of the pixel value variation of the LK method;

obtaining the outlier degree from the error function value of each pixel based on the obtained average and standard deviation;

setting whether the obtained outlier degree value is larger than a threshold as one of the conditions and determining that a corresponding pixel is not included in the calculation of the motion vector when the corresponding condition is realized.

19. An imaging apparatus comprising:

a solid-state imaging device;

an optical system that forms an object image on the solid-state imaging device;

an image processing apparatus that performs an image processing on an image using the solid-state imaging device; and a global motion estimation apparatus that performs global motion estimation (ME) on a current image and a reference image and then outputs a motion vector (MV), wherein the global motion estimation apparatus includes a motion estimation processing unit that has a function of executing a Lucas-Kanade (LK) method two or more times across a whole screen in order to perform the global motion estimation between the current image and the reference image; and the motion estimation processing unit obtains a set of motion vectors based on at least information about pixel value variation in a horizontal direction, pixel value variation in a vertical direction and pixel value variation in a time direction of a pixel, and information in which a calculation result of an arbitrary calculation expression which includes the pixel value variation in the horizontal direction, the pixel value variation in the vertical direction and the pixel value variation in the time direction is added across whole screen in first motion estimation, and determines whether to perform addition on each pixel according to a set condition when obtaining the information about the pixel value variation in the horizontal direction, the pixel value variation in the vertical direction and the pixel value variation in the time direction of the pixel, and information in which the calculation result of an arbitrary expression which includes the pixel value variation in the horizontal direction, the pixel value variation in the vertical direction and the pixel value variation in the time direction that are necessary to obtain the motion vector using the LK method is added across the whole screen, and obtaining and outputting a new set of motion vectors as a result of a second LK method, and obtains and outputs a new set of motion vectors as a result of a second LK method when the condition is satisfied in second motion estimation.

20. A program stored in a non-transitory computer readable medium allowing a computer to perform an image process comprising the steps of:

executing a Lucas-Kanade (LK) method two or more times across a whole screen in order to perform the global motion estimation between a current image and a reference image when performing global motion estimation (ME) on a current image and a reference image and then outputting an motion vector (MV);

in first motion estimation, obtaining a set of motion vectors based on at least information about pixel value variation in a horizontal direction, pixel value variation in a vertical direction and pixel value variation in a time direction of a pixel, and information in which a calculation result of an arbitrary calculation expression which includes the pixel value variation in the horizontal direction, the pixel value variation in the vertical direction and the pixel value variation in the time direction is added across the whole screen, and in second motion estimation, determining whether to perform addition on each pixel according to a condition when obtaining the information about the pixel value variation in the horizontal direction, the pixel value variation in the vertical direction and the pixel value variation in the time direction of the pixel and information in which the calculation result of an arbitrary expression which includes the pixel value variation in the horizontal direction, the pixel value variation in the vertical direction and the pixel value variation in the time direction that are necessary to obtain the motion vector using the LK method is added across the whole screen, and obtaining and outputting a new set of motion vectors as a result of a second LK method when the condition is satisfied.

* * * * *